United States Patent [19]
Freundner et al.

[11] Patent Number: 5,430,251
[45] Date of Patent: Jul. 4, 1995

[54] INSTALLATION SYSTEM

[75] Inventors: Hasso Freundner, Halver; Walter Grabowski, Olpe-Biggesee, both of Germany

[73] Assignee: Dorma GmbH +Co. KG, Ennepetal, Germany

[21] Appl. No.: 268,678

[22] Filed: Jun. 30, 1994

Related U.S. Application Data

[63] Continuation of Ser. No. 87,025, Jul. 2, 1993, abandoned, which is a continuation of Ser. No. 720,799, filed as PCT/PE90/00650, Aug. 24, 1990, abandoned.

[30] Foreign Application Priority Data

Aug. 29, 1989 [DE] Germany ............... 39 28 519.7

[51] Int. Cl.$^6$ ............................................. H02G 3/18
[52] U.S. Cl. ............................................. 174/53
[58] Field of Search ............................................. 174/53

[56] References Cited

U.S. PATENT DOCUMENTS

| | | | |
|---|---|---|---|
| 2,410,287 | 10/1946 | Jaberg | 174/53 |
| 3,038,141 | 6/1962 | Chiuchiolo | 174/53 X |
| 3,922,478 | 11/1975 | Perkey | 174/53 |
| 4,165,443 | 8/1979 | Figart et al. | 174/53 |
| 4,918,258 | 4/1990 | Ayer | 174/53 |
| 4,924,032 | 5/1990 | Akins | 174/53 |

*Primary Examiner*—Gerald P. Tolin
*Assistant Examiner*—D. A. Tone
*Attorney, Agent, or Firm*—Max Fogiel

[57] ABSTRACT

An electrical junction box has conductor sections in the form of contact rails inside the box. The box has sides with openings for passing power lines. Replaceable conducting strip holders hold the contact rails within recesses in the base of the box. Covers over the conducting strip holders have openings so that the contact rails are accessible from inside the box.

1 Claim, 5 Drawing Sheets

INSTALLATION SYSTEM

This application is a continuation of application Ser. No. 087,025 filed Jul. 2, 1993 now abandoned, which is a continuation of application Ser. No. 720,799 filed as PCT/PE90/00650, Aug. 24, 1990 now abandoned.

BACKGROUND OF THE INVENTION

The invention concerns an electrical-installation system involving junction boxes that accommodate electrical fittings like switches, consumer equipment, outlets, communications devices, etc. An installation system of this type is described in German OS 3 004 950.

That system involves boxes that accommodate electrical equipment. Embedded into the base of the boxes are conductive strips. The strips in adjacent boxes are connected by connectors that also combine the boxes into an installation system. Once the system has been installed, however, it is no longer possible to separate its components and the user is stuck with the original connections.

A surge-protected connecting and distributing box for communications is disclosed in German OS 2 341 232, which describes the boxes as having a definite elevation at the base or an elevation in the lid. This external characteristic, however, is intended only to inform the user of the surge protection.

German OS 3 431 836 describes an installation device intended for connecting switches, outlets, dimmers, antenna leads, and similar fittings. The object is to replace the device, which dictates the specific electric function, as simply as possible. A single type of base plate accepts such different types of connecting cable as power cords, antenna cables, etc. There is, however, a drawback to this system in that the specific electrical function of the individual devices is in the form of completely encapsulated plug-in modules.

SUMMARY OF THE INVENTION

With the state of the art summarized in the foregoing as a point of departure, the object of the present invention is to provide basic components in accordance with the known principle of installation that will be simple to manufacture and easy to install, comprising a stable dimensional structure and allowing modifications to be undertaken as far as the installed areas when the user so wishes. It must be emphasized, however, that it is not such consumer equipment as switches, plugs, etc. that are involved, but the basic unit of the installation system.

This object is attained in accordance with the invention in that junction boxes with one or more accommodations are created by providing permanent wiring at the base that can, however, when necessary be replaced with wiring of a different structure. The boxes can also be easily aligned at a desired distance apart. Access from the equipment is provided by way of prefabricated equipment-end lines and a simple system of plugs to the associated conductors at the base.

The junction boxes employed in accordance with the invention are basically of conventional design. It must be emphasized in particular that break-out entrances and passages have been stamped into their sides, through which the system can be provided with incoming and outgoing lines. The distribution of the conducting contact rails over the base of the boxes, embedded in a recess in the base in one special embodiment, constitutes the simplest conceivable solution for associating such a rail with the box. Power cords, circuit lines, and consumer equipment, the last by way of connecting lines from the equipment, can be individually connected, depending on the wiring diagram, to the strips associated with each box. A system of this type can definitely be constructed in accordance with the thresholds dictated by safety regulations, with at least five installation areas being aimed at. It has been demonstrated as especially practical that any modifications all the way down to separating and assembling installation areas can easily be undertaken subsequently, once the system has been installed, that is, at the connections themselves without having to interfere in the building structure in any way.

In the sense of providing the basic units that assemble into the installation system with adequate stability it has been demonstrated as practical to make the basic units, the single and multiple boxes, that is, interlocking. The ends of the housing in another embodiment can be removed. This approach results in an unimpeded passage through an installation system comprising several basic units. Assembly of the conducting contact rails in individual installation areas is facilitated by applying bridging wire to the cores of the rails in adjacent areas. When three individual junction boxes are combined, for example, the separable association of a partition that corresponds to the end with one of the housings can be provided between the installation areas in order to ensure spatial and electrical separation between the areas when necessary, when they are connected to different supply lines for example.

BRIEF DESCRIPTION OF THE DRAWINGS

One embodiment of the object of the invention will now be specified with reference to the schematic drawings, wherein.

DESCRIPTION OF THE PREFERRED EMBODIMENTS

Figure 1:
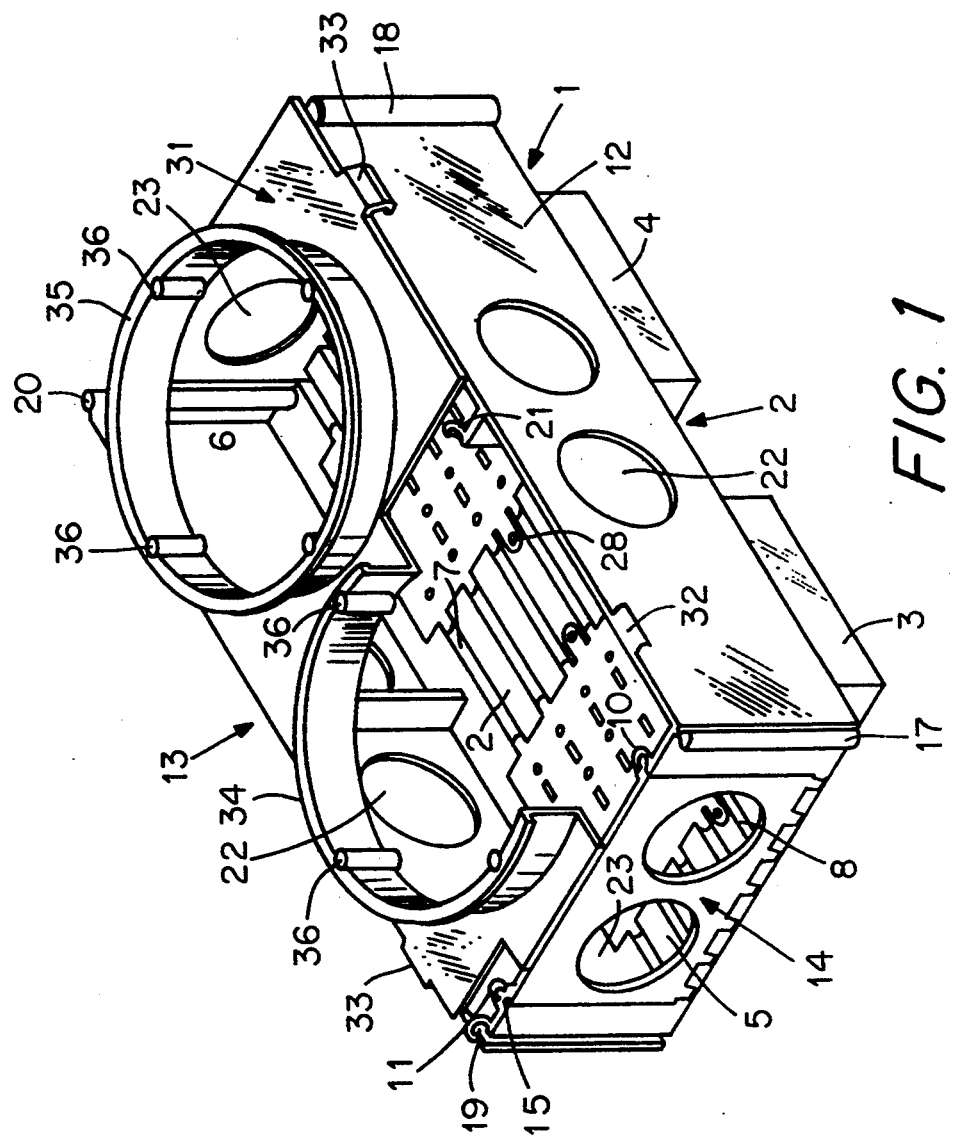
FIG. 1 illustrates a double junction box in accordance with the invention.
Figure 2:
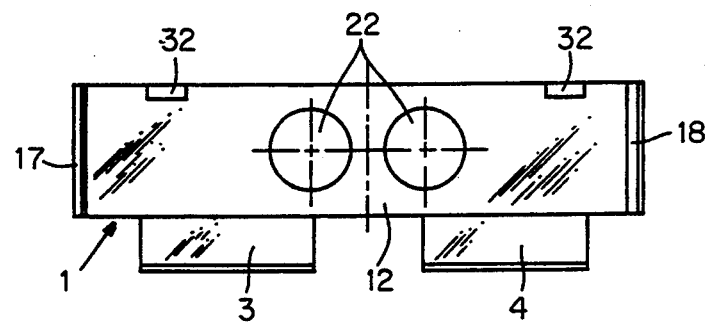
FIG. 2 is a side view of the box.
Figure 3:
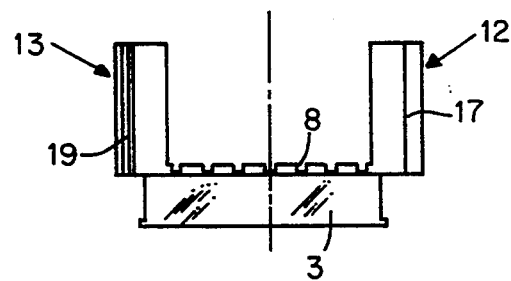
FIG. 3 is an end view of the box.
Figure 4:
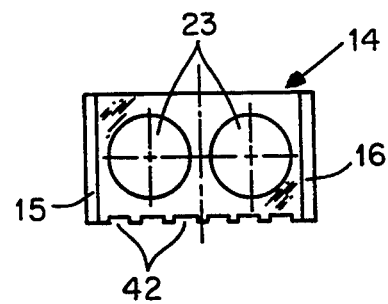
FIG. 4 illustrates one of the ends that can be inserted into and removed from the box illustrated in FIGS. 1 through 3.
Figure 5:
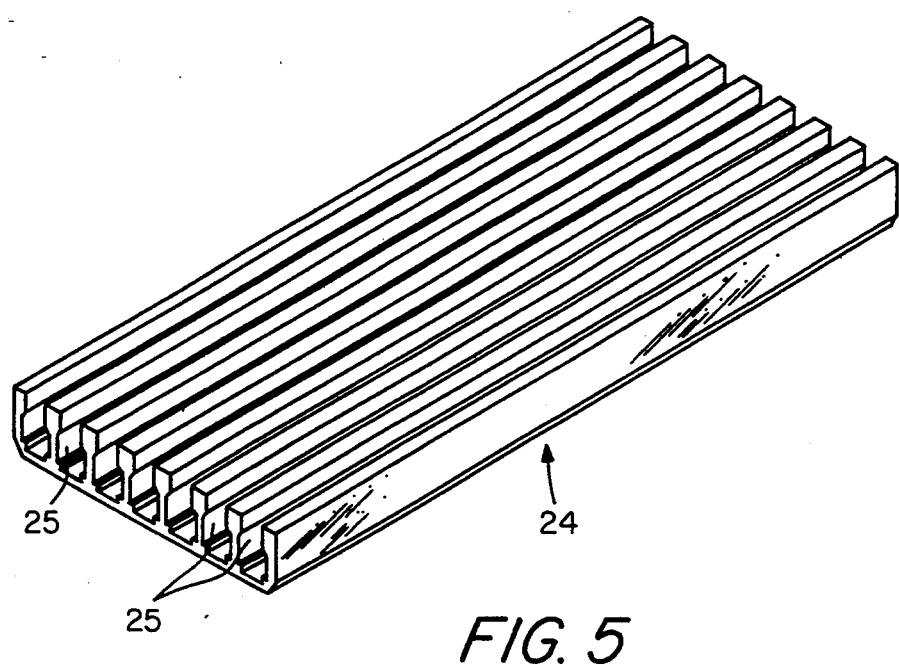
FIG. 5 is a perspective view of a conducting-strip holder.
Figure 6:
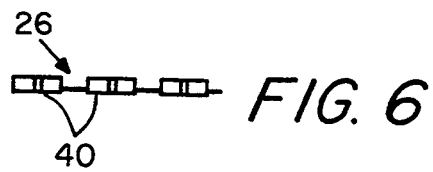
FIG. 6 illustrates a conducting contact rail that can be inserted in the holder illustrated in FIG. 5.
Figure 7:
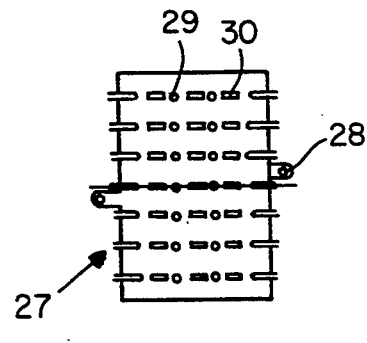
FIG. 7 is a top view of a cover associated with the conducting-strip holder.
Figure 8:
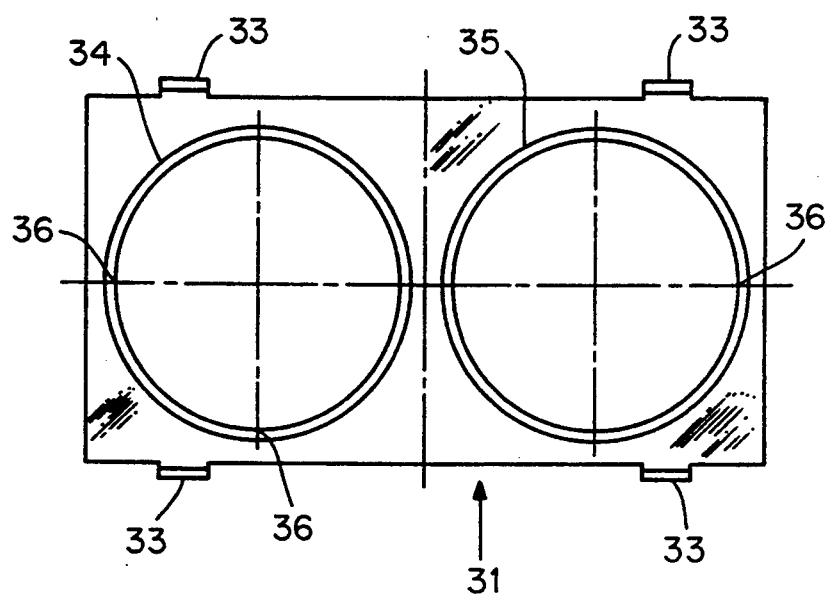
FIG. 8 is a top view of the mounting lid that can be placed over the double junction box illustrated in FIG. 1.
Figure 9:
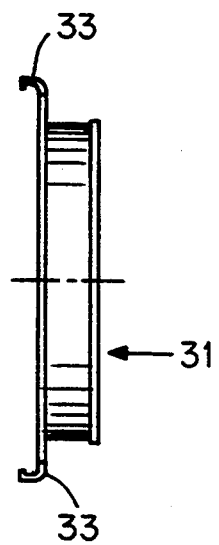
FIG. 9 is a front view of the lid.
Figure 10:
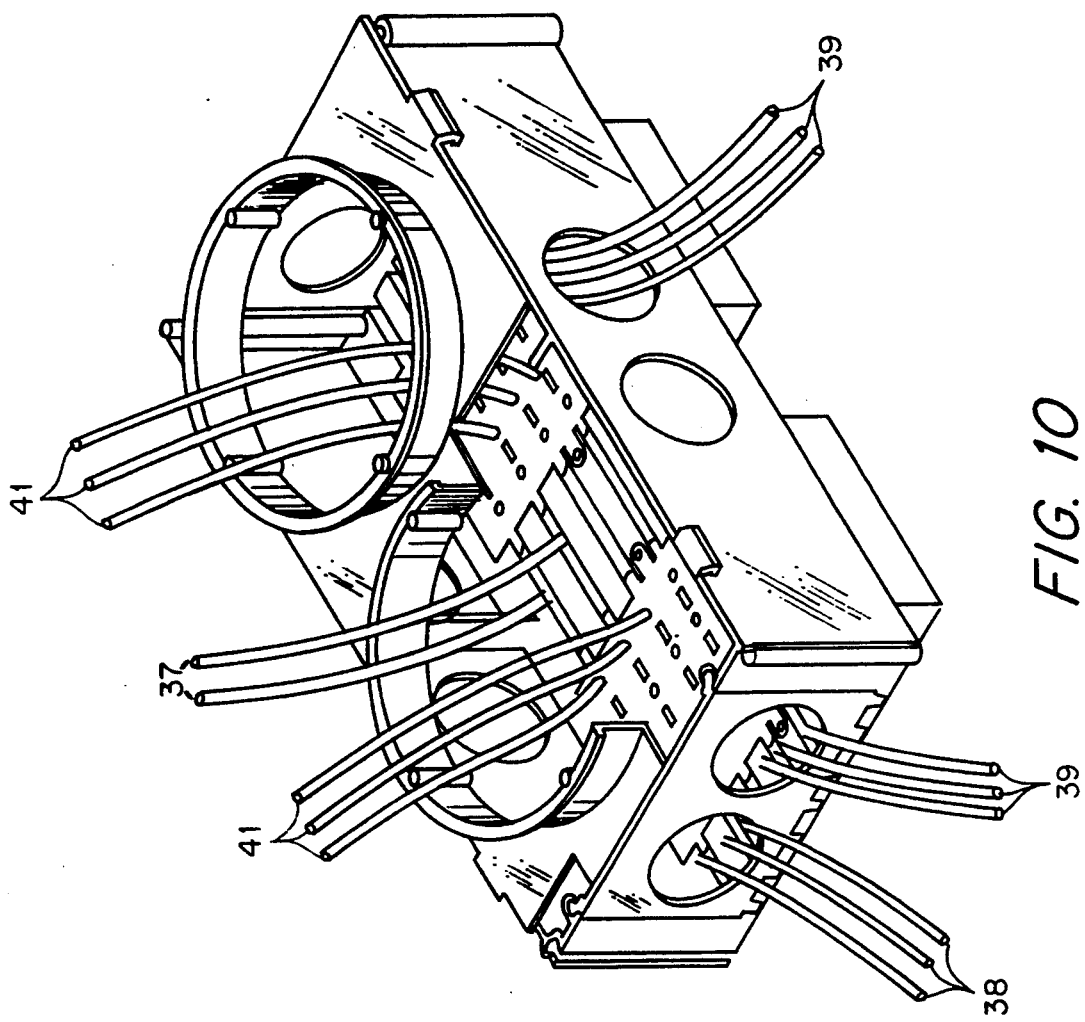
FIG. 10 is an illustration of the wiring.

The housing of the double junction box illustrated in FIGS. 1 through 3 consists of a base 1 that has two recesses 3 and 4 with a web 2 left between them, two long sides 12 and 13, and two ends 14 that can be attached to and removed from it. Additional webs 5 and 6 adjoin recesses 3 and 4 at the sections of the base of the housing not covered by the recesses. Webs 2, 5, and 6 have longitudinal grooves 7 and 8. The purpose of the grooves is to accommodate the connecting wires between the individual connection blocks inside recesses 3 and 4.

To allow ends 14 to be secured to and removed from the housing, the housing and the ends are provided with interlocking structures 10 and 11 and projections 15 and 16 that snap into them. When for example a threefold combination is employed with two different circuits, a bridge in the form of an end 14 must be inserted between the double and the single box. Indentations 42 make it possible in conjunction with grooves 7 and 8 for the corresponding lines to also extend beneath end 14.

The housings 9 are also provided with connectors 17, 18, 19 and 20 at the ends to allow two adjacent housings to be secured together. In this event the end 14 of one housing component acts when necessary as a partition between the adjacent contact areas. If modifications are made to the building later, the partition can easily be removed and the existing installation changed without any problems and without much installation expense. To satisfy this function, an end 14 can also be inserted in an existing housing component, for which purpose other connecting components 21 for example can also be provided on the housing component. Both long sides 12 and 13 and ends 14 can also be provided with dropouts 22 and passages 23. Dropouts 22 and passages 23 are normally closed off and can be broken through when needed.

The recesses 3 and 4 in base 1 are completely occupied by replaceable conducting-strip holders 24 made of an insulating material. The holders are made of an insulating material and are provided with a number of separated and adjacent channels 25 that have conducting contact rails 26 inserted in them. Extending over conducting-strip holder 24 and its conducting contact rails 26 is a cover 27 that interlocks with the recesses 3 and 4 in the base 1 of the housing by way of a connecter 28. Cover 27 has a number of separated perforations 29 and releasing slots 30 that provide access to the conductors below it. The cords that connect the consumer equipment, unillustrated in this case, that is to be attached are introduced into the appropriate perforations 29. The resilience of conducting contact rails 26 maintains the contact. The connection is disestablished by eliminating the conductor contact rail's hold on the inserted connecting cable by acting on a releasing slot 30 in a communicating cable inserted next to perforation 29 with a small, flat tool.

The housing of the embodiment illustrated in FIGS. 1 and 2 is finished off with a mounting lid 31 that locks onto the housing. The lid's attachment to housing 29 is ensured by catches 33 that engage beads 32 on long sides 12 and 13, constituting the interlock. This attachment can be rapidly disestablished with a screwdriver for example, providing access to the conducting-strip holders in the recesses under cover 27. The holders can be replaced once the cover has been removed or as an entire block.

Projecting out of mounting lid 31 are supporting rings 34 and 35, the purpose of which is to accommodate whatever equipment is being employed. Screws 36 generate a positive connection between the installed equipment and the installation system.

Depending on the particular application, the requisite number of boxes are locked together by way of fasteners 17, 18, 19, and 20. When a single box that is in principle designed for use with the illustrated double box is available, installation systems with any number of installation areas permitted by safety regulations can be constructed. The resulting installation system will finally be wired to conform with the particular installation requirements by securing bridging wires 37 connecting to conductors that may be placed in grooves 7 that extend between the adjacent installation areas (8,4) to the conductor sections that constitute a component of the areas and are assembled in the conducting-strip holders. The installation system is then connected to a power line 38 that is part of the main line and/or also to the connection wires 39 whereby the main line can as a rule extend through one of the ends 14 along with the circuit lines as well as through the dropouts 22 and passages 23 through the long sides 12 and 13 of the housing. The cores of the mains lines and of the connections wires 39 are connected by securing the rails 26 or connections that extend through the cover 27 over the conducting-strip holders 24 and into clips 40 that constitute a component of conducting contact rails 26 generally in an area of the installation system adjacent to one of the ends. The installation system, accordingly wired and provided with a mounting lid 31, is then mounted below or on the plaster. The installation equipment is then secured in its individual installation areas by way of connecting lines 41 in accordance with the wiring diagram. The securing can be carried out with securing elements on the connecting lines or by extending the insulated connecting lines 41 through perforations 29 as far as conducting contact rails 26. Connecting lines 41 themselves extend through perforations 29 introduced in the cover 27 over conducting-strip holders 24 for use as part of the still free clips 40 that constitute conductors. The installation equipment, connected and introduced into the housing, which rests, once it has been introduced into the housing, on the supporting rings 34 and 35 on mounting lid 31, is then connected to the lid by screws 36.

All of the electric linkages undertaken in the installation system can also be modified directly on the installed system without much expenditure when necessary. The multiple-core conductor sections embedded in the recesses can also be replaced by correspondingly different conductor sections, for communications systems for example. In so doing it is necessary to observe the prevailing regulations of the individual certifying institutions, especially with respect to the distances between conductors and to the appropriate contact pressure. These measures in accordance with the invention make the overall system very flexible and provide the electrician with substantially more room to work in.

We claim:

1. An electrical junction box connectable to other junction boxes to form a system of junction boxes and holding electrical devices for installing electrical equipment in series said junction box comprising: conductor sections in the form of contact rails inside said junction box and accessible from inside said box through openings of said box; said box having a base; each of said conductor sections extending over an area adjacent said base; interconnecting elements for connecting said conductor sections of adjacent areas to power-supply lines; said box having sides with openings forming entrances and passages for passing power lines through said openings; replaceable conducting strip holders insertable into said box below electrical equipment to be installed outside said box and connectable to said other boxes, said holders being secured against said base of said box and contacting conductor sections accessible from inside said box; said conducting contact rails being inserted into said holders and accessible from inside said box for connecting to other directly adjacent conducting contact rails in said box and for connecting to other conducting contact rails of conductor sections in said other boxes and for access to said interconnecting elements, said interconnecting elements being arranged for connecting said conductor sections to said power-supply lines and to circuit lines, said interconnecting elements being also arranged for connecting electrical equipment to accessible conducting contact rails; said base of said box having at least one recess for receiving one of said conducting strip holders; elevated areas on said base adjacent to said recess and having longitudinal grooves at a level of said conducting contact rails; covers over said conducting strip holders and securable relative to said box, said covers having at least two separate passages leading to said conducting contact rails; two of said sides of said box comprising separate elements locked to said box and insertable interlockingly into said box for separating adjacent boxes one from another; fasteners on said box for connecting said adjacent boxes; a mounting lid secured to said box; said conducting-strip holders together with said covers being replaceable.

* * * * *